US008412608B2

(12) United States Patent
Gonen

(10) Patent No.: US 8,412,608 B2
(45) Date of Patent: Apr. 2, 2013

(54) CURRENCY SYSTEM TO REWARD CONSTRUCTIVE BEHAVIOR

(75) Inventor: Rica Gonen, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 826 days.

(21) Appl. No.: 11/687,775

(22) Filed: Mar. 19, 2007

(65) Prior Publication Data

US 2008/0235121 A1  Sep. 25, 2008

(51) Int. Cl.
*G06Q 40/00* (2012.01)

(52) U.S. Cl. .......... 705/36 R; 434/350; 463/9; 463/16; 463/23; 705/37; 705/42; 705/59; 705/77; 705/35

(58) Field of Classification Search .......... 705/37, 705/42, 59, 77, 35; 463/9, 16, 23; 434/350
See application file for complete search history.

(56) References Cited

U.S. PATENT DOCUMENTS

| | | | |
|---|---|---|---|
| 4,109,918 A | 8/1978 | Mele et al. | |
| 4,856,788 A | 8/1989 | Fischel | |
| 4,955,616 A | 9/1990 | Ingalls | |
| 5,071,135 A | 12/1991 | Campbell | |
| 5,826,878 A | 10/1998 | Kiyosaki et al. | |
| 5,950,176 A * | 9/1999 | Keiser et al. | 705/36 R |
| 6,106,300 A | 8/2000 | Kiyosaki et al. | |
| 6,729,884 B1 | 5/2004 | Kelton et al. | |
| 6,767,210 B2 | 7/2004 | Joffe | |
| 6,912,510 B1 | 6/2005 | Shepherd | |
| 7,149,720 B2 | 12/2006 | Shepherd | |
| 2002/0055911 A1 | 5/2002 | Guerreri | |
| 2002/0116306 A1 | 8/2002 | Sheem | |
| 2002/0156710 A1 | 10/2002 | Ryder | |
| 2003/0083943 A1 | 5/2003 | Adams et al. | |
| 2004/0081942 A1 * | 4/2004 | Resnick | 434/107 |
| 2006/0223043 A1 | 10/2006 | Dancy-Edwards et al. | |
| 2007/0214049 A1 * | 9/2007 | Postrel | 705/14 |

FOREIGN PATENT DOCUMENTS

| | | |
|---|---|---|
| CA | 2 357 079 A1 | 3/2002 |
| WO | WO 01/06480 A1 | 1/2001 |

OTHER PUBLICATIONS

Nick Points, http://www.nick.com/mynick/trading/pointers.jhtml, 2 pages. (Jan. 25, 2007).
Reeves, D.M., et al., "Yootopia!" *ACM SIGecom Exchanges*, vol. V, No. N, p. 1-27 (2006).

\* cited by examiner

*Primary Examiner* — Daniel Felten
(74) *Attorney, Agent, or Firm* — Nathan O. Greene; Brinks Hofer Gilson & Lione

(57) ABSTRACT

A system is described for teaching users financial management using an online currency management system, including enabling an administrator to set up a financial account through a network. This step further includes assigning specific tasks for completion by one or more users, setting rules related to the management of play currency, and designating rewards that are earned by the one or more users through completion of the specific tasks. The system further includes providing a web-based interface for the one or more users to access and manage their own user account containing the play currency, and enabling the administrator to fund, with real currency, the purchase of the rewards by the one or more users with play currency.

25 Claims, 5 Drawing Sheets

CURRENCY SYSTEM TO REWARD CONSTRUCTIVE BEHAVIOR

BACKGROUND OF THE INVENTION

1. Technical Field

The disclosed embodiments relate to a play currency system and method, generally referred to as a system, for rewarding and teaching constructive family behavior.

2. Related Art

A number of games may have been produced in the past to teach children the management of money, such as MONOPOLY and other games that may teach aspects of personal finance. These games are overwhelmingly board games that join the entertainment value of playing with teaching aspects of personal finance. These games may not, however, teach as well as providing real rewards and participating in a real economy of trade.

SUMMARY

By way of introduction, the embodiments described below include a system and method for rewarding constructive family behavior. The embodiments relate to a system and methods for configuring and using a play currency system to teach personal finance management to users of the system through incentives such as the purchase of rewards.

In a first aspect, a method is disclosed for teaching users financial management using an online currency management system, including enabling an administrator to set up a financial account through a network. This step further includes assigning specific tasks for completion by one or more users, setting rules related to the management of play currency, and designating rewards that are earned by the one or more users through completion of the specific tasks. The method further includes providing a web-based interface for the one or more users to access and manage a user account containing the play currency, and enabling the administrator to fund, with real currency, the purchase of the rewards by the one or more users with play currency.

In a second aspect, a financial trainer server is disclosed for teaching users financial management using an online currency management system. The system includes a network interface for communicating over a network. A memory stores records of at least user accounts and a rules database. A rules engine controls the user accounts and has access to the memory such that the rules engines enables an administrator to set up a financial account over a network. This step further includes assigning specific tasks for completion by one or more users, setting rules related to the management of play currency, and designating rewards that are earned by the one or more users through completion of the specific tasks. The rules engine further enables the administrator to fund, with real currency, the purchase of the rewards by the one or more users with play currency. The system further includes a user interface for the one or more users to access and manage a user account containing the play currency.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
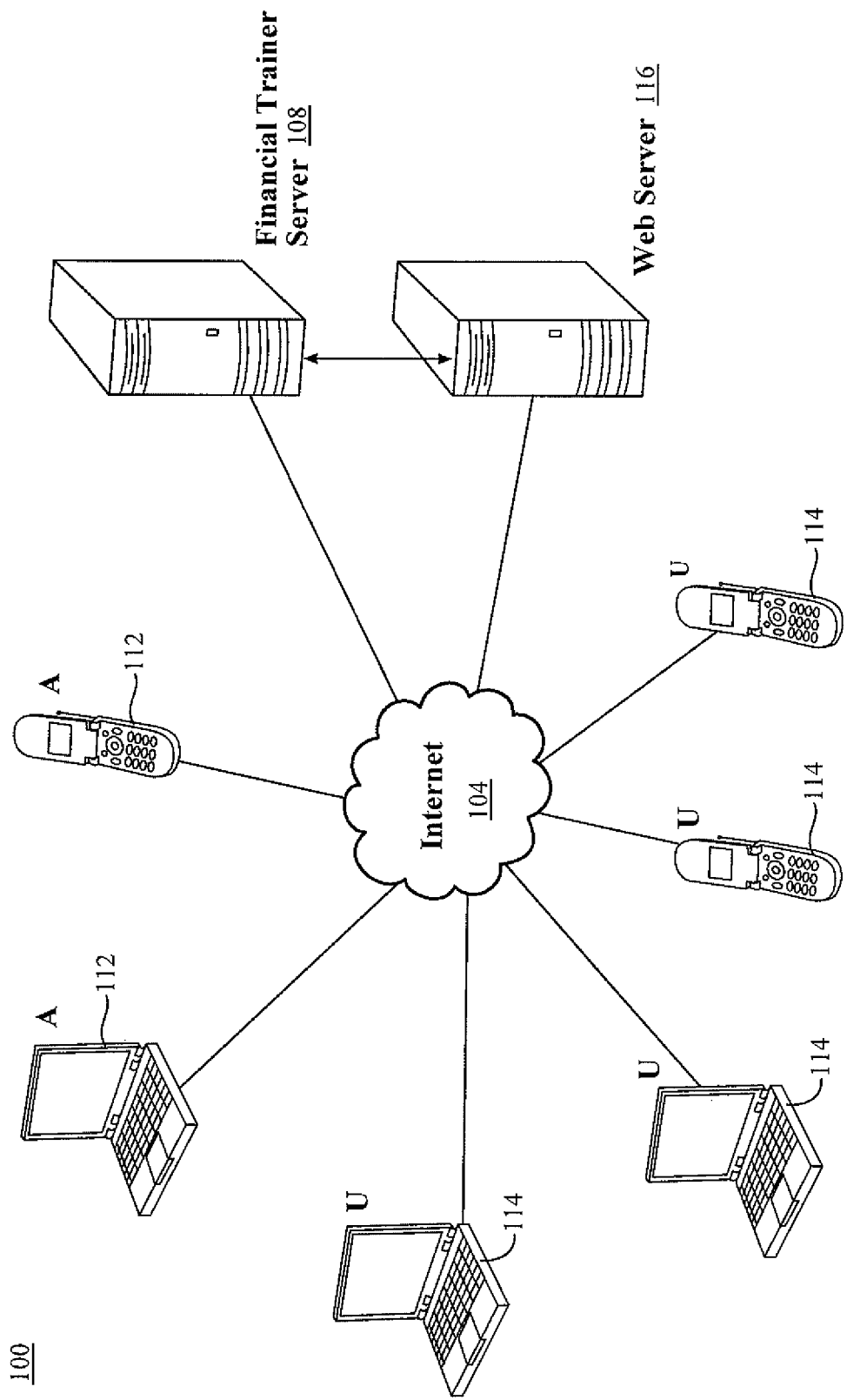
FIG. 1 is a diagram of an exemplary system for rewarding constructive family behavior.

In the following description, numerous specific details of programming, software modules, user selections, network transactions, database queries, database structures, etc., are provided for a thorough understanding of various embodiments of the systems and methods disclosed herein. However, the systems and methods disclosed can be practiced without one or more of the specific details, or with other methods, components, materials, etc.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the embodiments disclosed may be changed as would be apparent to those skilled in the art. Thus, any order in the Figures or Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

The embodiments relate to teaching with real rewards and actual participation in an economy of trade. This may be analogous to saying that on-the-job training is more effective than learning solely in a classroom environment. For the sake of convenience, the embodiments are described in terms of a system for use with a family, but the system may also be used in other ways such as with others, including adults, that struggle with debt reduction or financial management principles. In the latter, an administrator of the system may be a debt counselor, a therapist, a minister, a financial planner, etc.

FIG. 1 is a diagram of an exemplary system 100 for rewarding constructive family behavior, such as in a family setting. The system may communicate through the Internet 104, the World Wide Web, or through another communications network (hereinafter referred to as the "Internet"). A financial trainer server 108 (or variably referred to as a "financial trainer" 108) may communicate through the Internet 104 and receive access by administrators 112 and users 114 of the system 100. The administrators 112 and users 114 may access the financial trainer 108 through a laptop, desktop, cell phone, personal digital device, or other computing device, whether wireless or wired. Ease of access may facilitate the use of the system 100 to reward constructive family behavior.

A Web server 116 may communicate through the Internet 104 and optionally communicates directly with the financial trainer server 108, e.g. where the Web server 116 belongs to the sponsor of the financial trainer server. Because the financial trainer 108 may be accessible through a web-based interface, it may be operatively connected over a network to the Web server 116 to provide such an interface to the administrator 112 and users 114. Indeed, the financial trainer 108 and Web server 116 may be combined into a single server.

The administrator 112 may be a parent or guardian who desires to set up a play currency management system 100 for use by a family. Play currency may include any form of currency other than that used in a real world economy of trade, and may include arbitrary units of measure. The users 114, therefore, may include the children of the family and may include selected extended family members on a case-by-case basis as invited to participate in the system 100 by the administrator 112. Other types of administrators 112 may include an organization head, a debt counselor, a therapist, a minister, a financial planner, etc.

The initial configuration of the system may be accomplished through an Internet 104 access to the financial trainer server 108, wherein the administrator 112 may be given a variety of options regarding the management of the play currency and the configuration of the system 100. Such access may include Web-based access through Web browsers. The configuration includes assigning tasks that may be performed by the users 114 to earn an amount of play currency, in addition to assigning chores to the users 114 that must be performed without remuneration, but which may be traded away, or a user 114 may pay another to perform. The details of setting up or configuring the system 100 are discussed in more detail below.

Through configuration of the system 100, the administrator 112 may provide training structure, which may resemble real-life, in which the users 114 learn how to manage money, and how to do so in social contexts. The fact that the system 100 is based on a play currency may allow a financially safe environment in which to experiment with financial concepts; and, the online aspect of using the system 100 allows sponsors of the financial trainer 108 and partners thereof to profit from administrators 112 who pre-authorize and fund the purchase of rewards with use of the play currency. Rewards may include products and services of interest to children or other users 114.

Use of play currency may be desirable to the extent that participants (e.g., administrators 112 and users 114) prefer not to use real currency and are exchanging services. Furthermore, the use of play currency to trade or cash-in for rewards allows sponsors and partners to generate additional revenue. In the context of the family, children may be taught to manage money without using actual currency, thus providing parents some level of control over the use and spending of the play currency, while rewarding children for achieving goals and/or specific tasks. The system 100 may also help siblings (or other family members) to cooperate better by trading chores or purchasing tasks from each other. Socially beneficial behavior is also encouraged where a user 114 may act altruistically on behalf of another user 114 without regard to gain or maintenance of his/her play currency.

Figure 2:
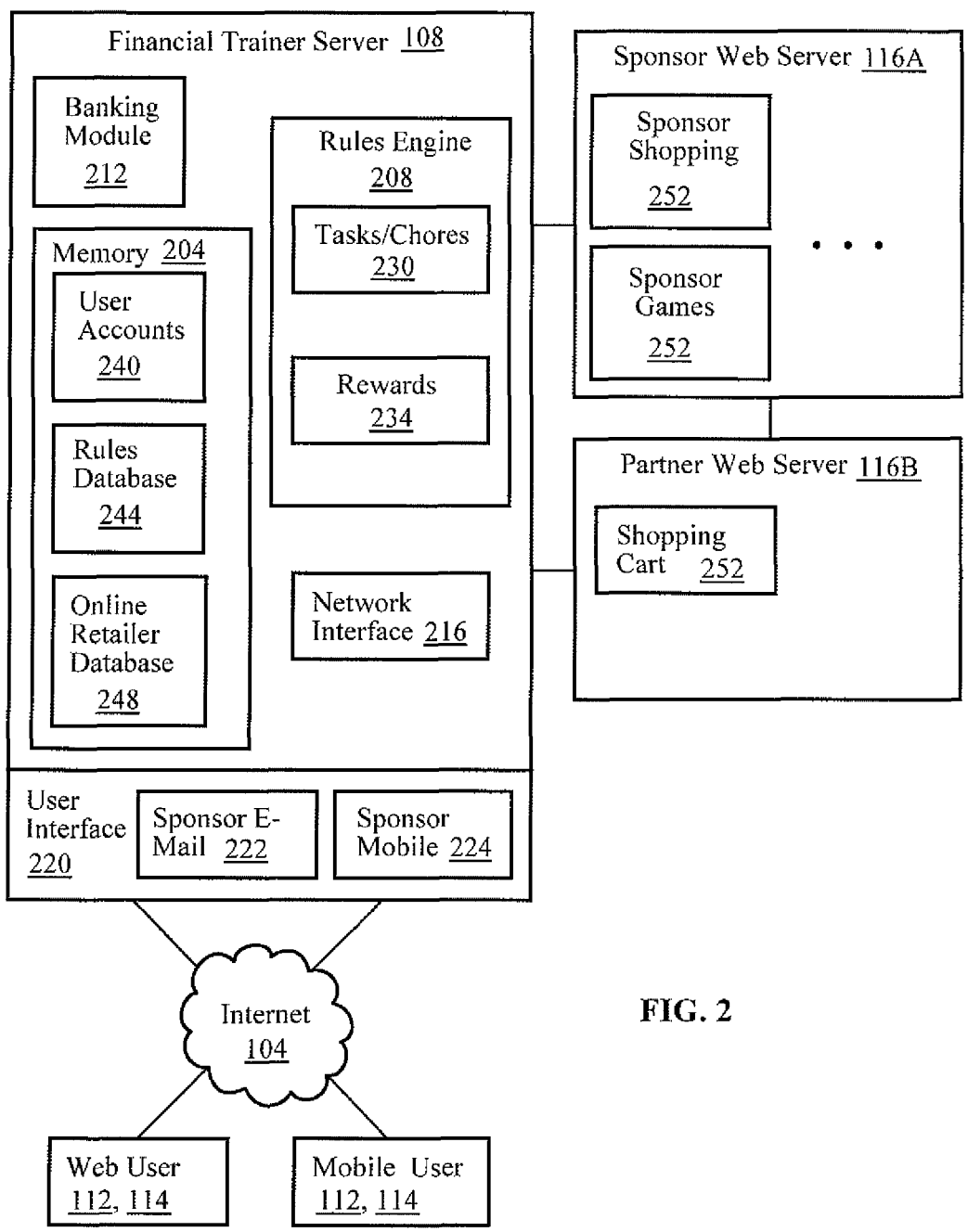
FIG. 2 is an exemplary block diagram of a financial trainer server and its interaction with users and other Web servers.

FIG. 2 is an exemplary block diagram 200 of a financial trainer server 108 and its interaction with users 112, administrators 114, and Web servers 116A and 116B. The financial trainer 108 may include memory 204, a rules engine 208, a banking module 212, and a network interface 216. The memory 204 provides instructions (such as via software, firmware and/or hardware) and data storage to the rules engine 208. A user interface 220 allows users 114 and administrators 112 to access the network interface 216, thereby gaining access to the financial trainer 108 for configuration and use of the system 100. The user interface 220 may include a link to a sponsor's e-mail 222 and mobile 224 services, for instance, to facilitate integration of the sponsor's services.

The user interface 220 also includes user account access to check account balances, trade tasks or chores, purchase or bid on tasks, and transfer currency among other users 114 and administrators 112. The user interface also allows a user 112 to request that play currency be added to his/her account upon completion of a task, and to complete purchases of rewards with play currency in his/her account.

The rules engine 208 further includes a tasks/chores module 230 and a rewards module 234 for activities specific to each, according to the rules initially set up by at least one administrator 112. Thus, these specific modules (tasks/chores 230 and rewards 234) may be separate sections of code to handle related specific rules, or may be integrated with the rules engine 208 in their execution. The memory 204 further includes user accounts 240 to track play currency balances, tasks, and chores. The memory 204 also includes a rules database 244 to store the various rules as set by the administrator that may govern the functioning of the system 100, and an online retailer database 248 for tracking specific online retailers from which users 114 may be pre-authorized to purchase.

Users 112 may browse through sponsor or partner web pages found on a sponsor Web server 116A or on a partner Web server 116B (variably referred to as "online retailers" 116) for items pre-authorized for purchase by the administrator 112. Once a user 114 accumulates enough play currency in his/her user account 240 to purchase a desired reward, the user interface 220 enables the purchase of the reward. Rewards, including products and services, may be available from such sponsors and partners, which may include items such as gaming systems, games, electronics, and services such as mobile phone minutes or e-mail usage, to name just a few. The banking module 212 may communicate with the online retailers 116 when a purchase is requested in order to execute an online purchase of a pre-authorized reward with the use of play currency accumulated in the account 240 of the user 114.

More specifically, the banking module 212 controls the in and out flows of play currency through user accounts 240 as dictated by the rules engine 208 and as pre-authorized by the administrator 112. The banking module 212 may store in the online retailer database 248 the following information (among other information): the real currency payment information of the administrator 112; the specific rewards pre-authorized for purchase by the users 114; and a value in play currency required for a user to purchase each specific reward. The banking module 212 clears a user 114 to purchase a reward by ensuring that the user 114 has sufficient play currency in his/her account 240. Once cleared for purchase, the banking module 212 may communicate with a similar module of the online retailer 116 to execute the transfer of real currency from an account of the administrator 114 to pay for the reward, in addition to debiting the value in play currency for the reward from the user's account 240.

Various purchasing modules 252 may include such areas of the online retailers 116 as "Sponsor Shopping," "Sponsor Games," "Shopping Cart," and other forms of online browsing and purchasing options. A more detailed discussion of the online retailers 116 is found below with reference to FIG. 5. The above explanation of the system 100 and exemplary functioning of a financial trainer server 108 are explained in further detail with reference to the remaining Figures.

Figure 3:
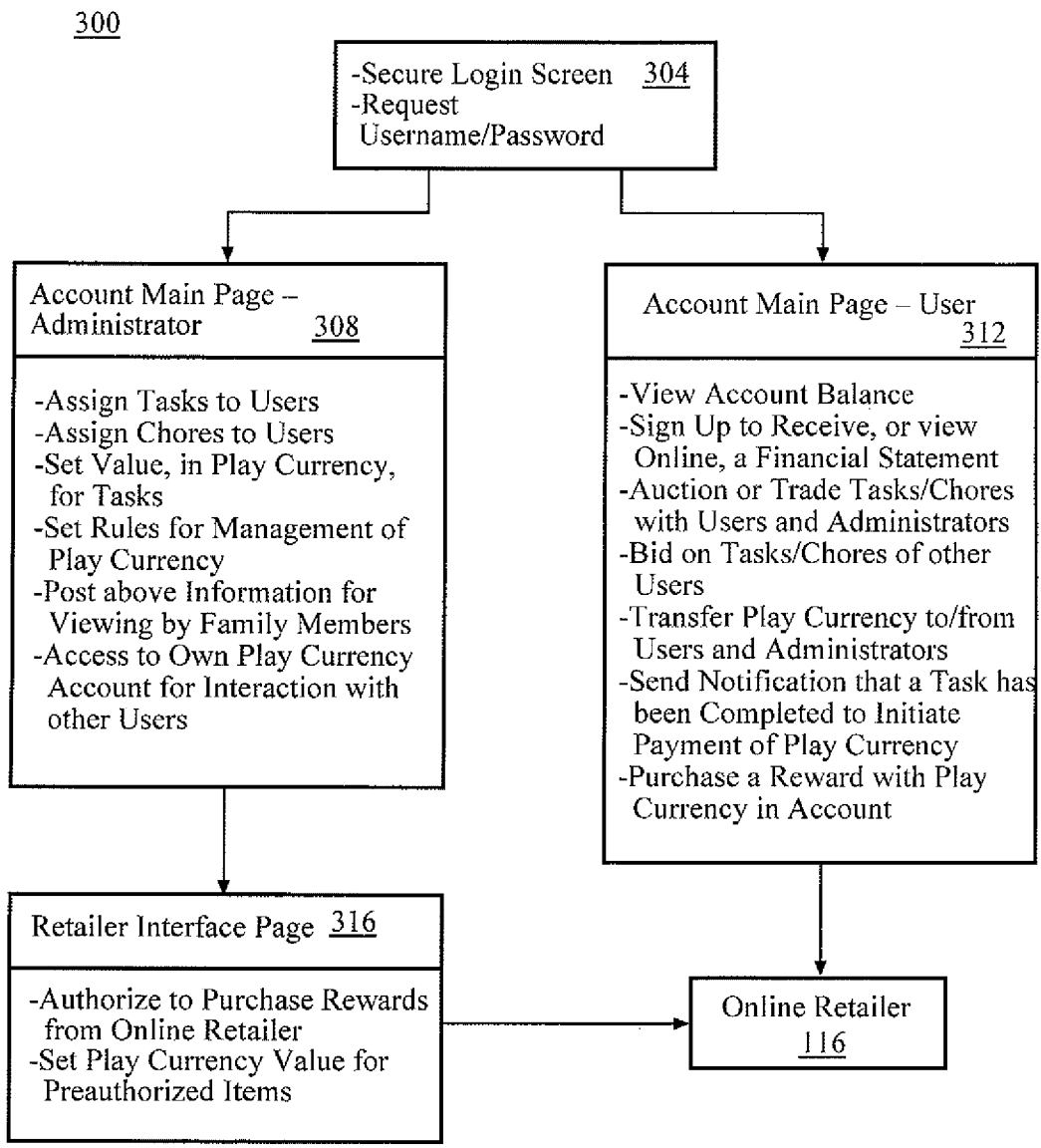
FIG. 3 is a flow chart of an exemplary login screen and account pages accessible through administrator and user accounts of the system of FIGS. 1 and 2.

FIG. 3 is a flow chart 300 of an exemplary login screen 304 and account pages accessible through user accounts 240 and by the administrator 112 of the system 100 of FIGS. 1 and 2. The user interface 220 discussed with reference to FIG. 2 functions together with the rest of the financial trainer 108 to give a certain level of access to those seeking to login. The login screen 204 may include a portion in which the administrator 112 or user 114 inputs his/her username and password to gain access. Such authorized access selectively sends the administrator 112 to an administrator's account main page 308 and the user 114 to a user's account main page 312, each associated with their respective accounts. The administrator 112 also has access to a retailer interface page 316, which allows the administrator 112 to authorize the purchase of rewards from one or more online retailers 316, and to set the currency value for pre-authorized reward items. The retailer interface page 316 communicates with the one or more online retailers 116 to execute such pre-authorization and allows the users 114 to access and purchase the rewards from the online retailers 116.

Figure 4:
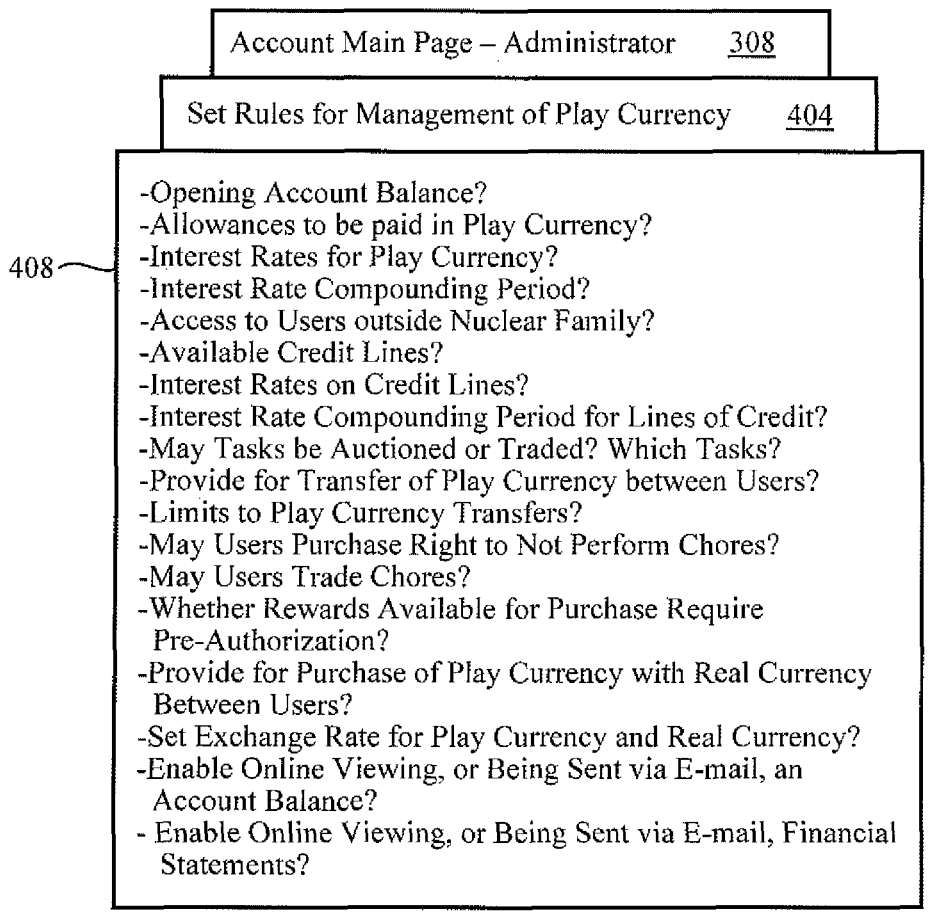
FIG. 4 is a flow chart of an exemplary administrator subpage for setting rules related to the management of play currency and other user options of the system of FIGS. 1 and 2.

The administrator 112 may, such as from the administrator account main page 308, assign tasks and chores to the users 114, set a value in play currency for completion of the tasks, and set rules for management of play currency, among other user options (see FIG. 4). This information may be posted for viewing by family members, to include administrators 112 and users 114. An administrator 112 may also set up his/her own user account 240 containing play currency for direct interaction with the user accounts 240 of other family members. The administrator 112, therefore, may be included in the definition of "user" 114 to the extent the administrator 112 may also have a user account with play currency and all the capabilities of the user accounts 240 owned by users 114.

Furthermore, the user 114 may execute the following actions from the user's main page 312. The user 114 may view an account balance, and optionally sign up to receive or view online a financial statement that includes a history of transactions. The user 114 may auction or trade tasks/chores with other users 114. The user 114 may also bid on other tasks/chores being auctioned (or traded) by other users 114. The user 114 may also transfer play currency to/from the other users 114 (which includes the administrator 112). The user 114 may also send notification that a task has been completed to initiate payment of play currency to his or her user account 240 in the amount set for that task by the administrator 112. Finally, the user 114 may purchase rewards from the online retailers 116 once the user 114 has accumulated sufficient play currency for the purchase of such rewards.

FIG. 4 is a flow chart 400 of an exemplary administrator sub-page 404 for setting rules related to the management of play currency and other user options 408 of the system of FIGS. 1 and 2. As discussed with reference to FIG. 3, sub-page 404 may be accessible through the administrator's account main page 308. The included list of configuration options 408 provides the administrator 112 with the maximum flexibility in setting out the parameters by which the play currency may be earned and used, and by which the tasks/chores may be traded and auctioned.

The following options 408 may be provided to the administrator 112 as a way to configure the rules by which the system 100 functions. An administrator 112 may answer with a yes or no, or provide the requested details to the following questions:

Do you want to provide opening account balances in play currency?

Do you want to pay regular allowances in play currency to users?

Do you want to set an interest rate by which users' play currency may grow? If so, indicate an interest rate compounding period.

Do you want to provide access to users outside the nuclear family, e.g. to cousins, nephews, or nieces? If so, to whom?

Do you want to make lines of credit in play currency available to users?

Do you want to provide interest rates on credit lines by which users' debts may grow? If so, indicate an interest rate compounding period.

May tasks be auctioned or traded? If so, which tasks?

Do you want to enable the transfer of currency between users? If so, do you want to limit the amount of play currency allowed to be transferred?

May users purchase the right to not perform chores? May users purchase the right to other privileges, e.q., a day at the zoo or at the beach? May users trade chores or privileges?

Figure 5:
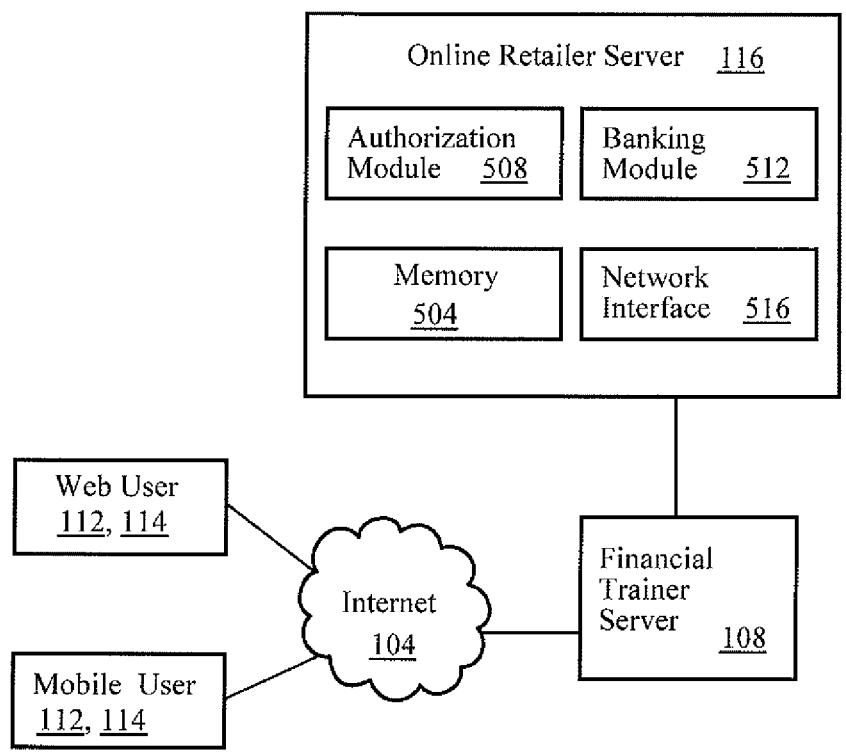
FIG. 5 is a diagram of an exemplary online retailer server of a system for rewarding constructive family behavior.

Do rewards available for purchase require pre-authorization? Upon choosing yes, this option may include links to various sponsors or partnered web sites for choosing among products and services for pre-authorization (see FIG. 5).

May users purchase real currency with play currency from other users? If so, indicate an exchange rate for such purchase of real currency with play currency.

Enable viewing account balances? Enable viewing financial statements? Enable receipt by users of e-mail or text message financial statements? Enable receipt by users of e-mail or text message financial statements?

FIG. 5 is a diagram 500 of an exemplary online retailer server 116 of a system 100 for rewarding constructive family behavior. As discussed previously with reference to FIG. 2, an online retailer server 116 may be that of a sponsor or a partner of a sponsor of the system 100 that includes the financial trainer 108. The online retailer server 116 may also be a shopping cart, or other sub-system of an online retailer's Web server 116, as required to carry out the online retailer's portion of the system 100.

The online retailer server 116 may include memory 504, and an authorization module 508 to enable an administrator 112 to preauthorize rewards for purchase and to identify users 114 authorized to purchase the rewards, the details of which are stored in the memory 504. A banking module 512 may also be provided which communicates through a network interface 516, through the Internet 104, or other network, and with the financial trainer server 108 to complete purchase of a pre-authorized reward by a user 114.

The memory 504, therefore, may also include the administrator's real currency payment information and a value in play currency required for a user 114 to purchase each reward. Upon request by a user 114 to purchase a reward, the banking module 512 may perform a method comprising debiting the user's account 240 the value in play currency for the reward, and debiting the administrator's bank or credit account a value in real currency for the reward. In the alternative, the step of debiting the user's account 240 the value in play currency may occur by the functioning of the banking module 212 or rules engine 208 of the financial trainer 108 after the administrator 112 is debited an amount in real currency for the reward.

While specific embodiments and applications of various methods and systems for conducting experiments over the Internet have been illustrated and described, it is to be understood that the disclosure claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein include one or more steps or actions for performing the described methods. The method steps and/or actions may be interchanged with one another. In other words, unless a specific order of steps or actions is required for proper operation of the embodiment, the order, and/or use of specific steps, and/or actions may be modified without departing from the scope of the disclosure as claimed.

The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for teaching users financial management using an online currency management system, the method being carried out by a computer having a rules engine and system memory, the method comprising:
  enabling, with the rules engine, an administrator to set up, through an administrator, web-based interface of the computer, a financial account comprising:
    assigning specific tasks comprising chores for completion by one or more users;
    setting rules related to the management of a play currency designed to provide financial management education in an economy of trade that employs the play currency and that rewards constructive behavior; and
    designating rewards that are earned by the one or more users through completion of the specific tasks, wherein the rewards comprise products and services of interest according to the ages of the one or more users;
  providing a user, web-based interface of the computer for the one or more users to access and manage a user account containing the play currency, comprising:
    enabling a user to indicate when a task is completed to initiate payment of play currency into the user account; and
    enabling a user to trade tasks and chores with other users; and
  enabling the administrator to fund through the administrator interface, with real currency, the purchase of the rewards by the one or more users with play currency.

2. The method of claim 1, wherein enabling the administrator to set up a financial account comprises enabling the administrator to:
  set a quantity of play currency associated with each specific task;
  associate a value in terms of play currency with each reward; and
  inform the one or more users, in terms of play currency, the quantity associated with each task and the value associated with each reward.

3. The method of claim 1, wherein the administrator comprises a parent or guardian, and the one or more users comprise children.

4. The method of claim 1, wherein providing a web-based user interface comprises enabling a user to check his or her balance of play currency, and to directly purchase pre-approved awards from an online retailer.

5. The method of claim 1, further comprising:
  enabling the administrator and the one or more users to transfer the play currency to the administrator and the one or more users; and
  enabling the administrator to approve or disapprove the transfer of play currency by a user.

6. The method of claim 1, wherein setting rules related to the management of play currency comprises enabling the administrator to accept play currency in exchange for a user not having to execute a chore, or in exchange for another privilege.

7. The method of claim 1, wherein setting rules related to the management of play currency comprises enabling a user to auction tasks among a plurality chosen from the group consisting of an administrator and other users, the method further comprising:
  enabling at least one of the administrator and the other users to bid on the tasks, wherein a highest bidder is transferred the task for completion.

8. The method of claim 1, wherein setting rules related to the management of play currency comprises:
  enabling the administrator to pre-authorize the purchase of the rewards by the one or more users from at least one online retailer; and
  enabling the one or more users to directly purchase the pre-authorized awards from the online retailer.

9. The method of claim 1, wherein setting rules related to the management of play currency comprises:
  setting an interest rate at which the play currency grows in user accounts; and
  setting an interest rate compounding period.

10. The method of claim 1, wherein setting rules related to the management of play currency comprises:
  enabling the one or more users to trade the specific tasks with each other; and enabling the administrator to approve or disapprove a trade of the specific tasks.

11. The method of claim 1, wherein setting rules related to the management of play currency comprises enabling the administrator to extend a credit line to the one or more users to aid in purchasing the rewards, the method further comprising:
   setting an interest rate attached to amounts credited to the one or more users; and
   setting an interest rate compounding period for the credit line.

12. A method for teaching users financial management using an online currency management system, the method being carried out by a computer having a rules engine and system memory, the method comprising:
   enabling, with the rules engine, an administrator to set up, through an administrator, web-based interface of the computer, a financial account comprising:
      assigning specific tasks comprising chores for completion by one or more users;
      setting rules related to the management of a play currency designed to provide financial management education in an economy of trade that employs the play currency and that rewards constructive behavior, wherein setting rules further comprises:
         enabling a user to auction tasks among a plurality chosen from the group consisting of an administrator and other users;
         enabling at least one of the administrator and the other users to bid on the tasks, wherein a highest bidder is transferred the task for completion; and
      designating rewards that are earned by the one or more users through completion of the specific tasks, wherein the rewards comprise products and services of interest according to the ages of the one or more users;
   providing a user, web-based interface of the computer for the one or more users to access and manage a user account containing the play currency; and
   enabling the administrator to fund through the administrator interface, with real currency, the purchase of the rewards by the one or more users with play currency.

13. The method of claim 12, wherein enabling the administrator to set up a financial account comprises enabling the administrator to:
   set a quantity of play currency associated with each specific task;
   associate a value in terms of play currency with each reward; and
   inform the one or more users, in terms of play currency, the quantity associated with each task and the value associated with each reward.

14. The method of claim 12, wherein the administrator comprises a parent or guardian, and the one or more users comprise children.

15. The method of claim 12, wherein providing a web-based user interface comprises enabling a user to check his or her balance of play currency, and to directly purchase pre-approved awards from an online retailer.

16. The method of claim 12, further comprising:
   enabling the administrator and the one or more users to transfer the play currency to the administrator and the one or more users; and
   enabling the administrator to approve or disapprove the transfer of play currency by a user.

17. The method of claim 12, wherein setting rules related to the management of play currency comprises enabling the administrator to accept play currency in exchange for a user not having to execute a chore, or in exchange for another privilege.

18. The method of claim 12, wherein setting rules related to the management of play currency comprises enabling a user to auction tasks among a plurality chosen from the group consisting of an administrator and other users, the method further comprising:
   enabling at least one of the administrator and the other users to bid on the tasks, wherein a highest bidder is transferred the task for completion.

19. The method of claim 12, wherein setting rules related to the management of play currency comprises:
   enabling the administrator to pre-authorize the purchase of the rewards by the one or more users from at least one online retailer; and
   enabling the one or more users to directly purchase the pre-authorized awards from the online retailer.

20. A computer-readable storage medium comprising a set of instructions for teaching users financial management using an online currency management system, the set of instructions executable by a computer having a processor and memory, the set of instructions comprising:
   instructions to direct the processor to enable an administrator to set up, through an administrator, web-based interface of the computer, a financial account comprising:
      assigning specific tasks comprising chores for completion by one or more users;
      setting rules related to the management of a play currency designed to provide financial management education in an economy of trade that employs the play currency and that rewards constructive behavior; and
      designating rewards that are earned by the one or more users through completion of the specific tasks, wherein the rewards comprise products and services of interest according to the ages of the one or more users;
   instructions to direct the processor to enable the administrator, through the administrator interface, to extend a credit line to the one or more users to aid in purchasing the rewards;
   instructions to direct the processor to set an interest rate attached to amounts credited to the one or more users, and to set an interest rate compounding period for the credit line in response to an input from the administrator submitting the interest rate and interest rate compounding period;
   instructions to direct the processor to provide a user, web-based interface of the computer for the one or more users to access and manage a user account containing the play currency; and
   instructions to direct the processor to enable the administrator to fund through the administrator interface, with real currency, the purchase of the rewards by the one or more users with play currency.

21. The computer-readable storage medium of claim 20, wherein the instructions to enable the administrator to set up a financial account comprises:
   instructions to direct the processor to set a quantity of play currency associated with each specific task responsive to an input from the administrator setting the quantity of play currency;
   instructions to direct the processor to associate a value in terms of play currency with each reward; and instructions to direct the processor to inform the one or more users, in terms of play currency, the quantity associated with each task and the value associated with each reward.

22. The computer-readable storage medium of claim 20, further comprising:
instructions to direct the processor to enable the administrator and the one or more users to transfer the play currency to the administrator and the one or more users; and
instructions to direct the processor to enable the administrator to approve or disapprove the transfer of play currency by a user.

23. The computer-readable storage medium of claim 20, wherein setting rules related to the management of play currency comprises enabling the administrator to accept play currency in exchange for a user not having to execute a chore, or in exchange for another privilege.

24. The computer-readable storage medium of claim 20, wherein setting rules related to the management of play currency comprises:
setting an interest rate at which the play currency grows in user accounts; and
setting an interest rate compounding period for the currency in the user accounts.

25. The computer-readable storage medium of claim 20, wherein setting rules related to the management of play currency comprises:
enabling the one or more users to trade the specific tasks with each other; and
enabling the administrator to approve or disapprove a trade of the specific tasks.

* * * * *